Patented Jan. 5, 1932

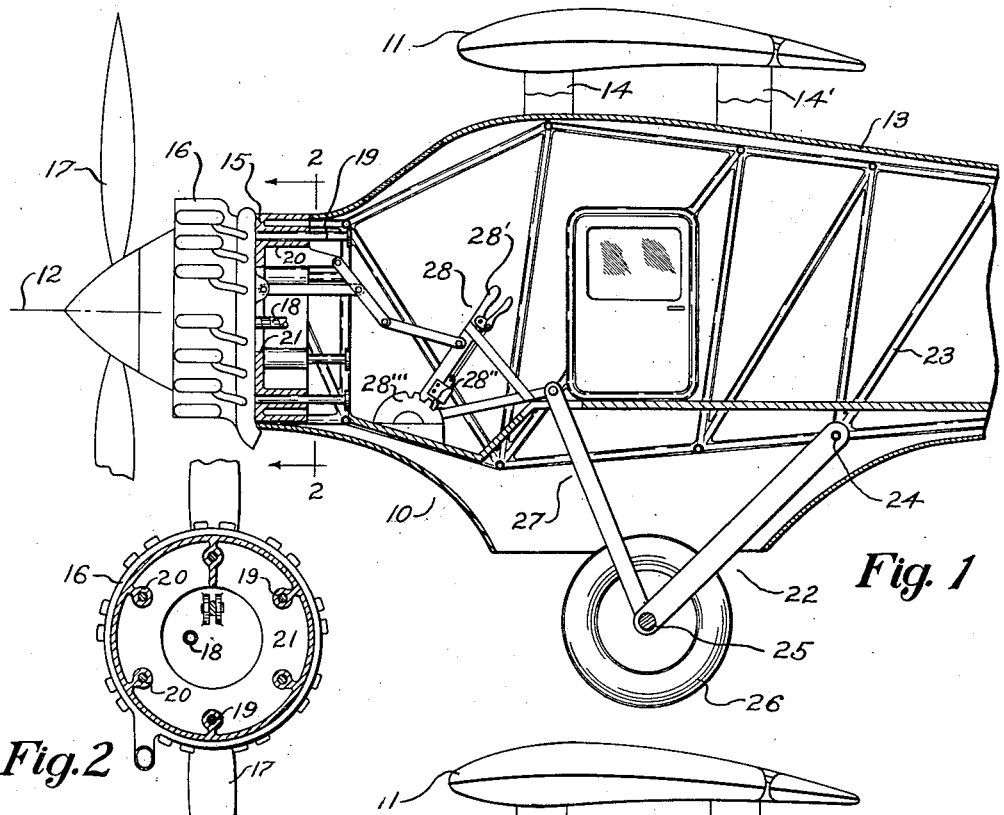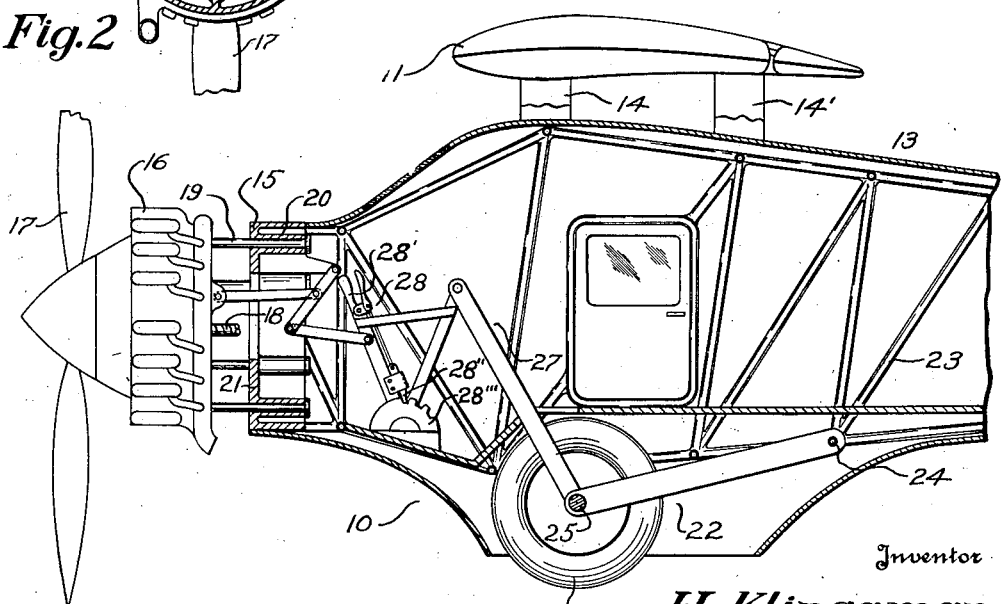

1,839,563

UNITED STATES PATENT OFFICE

HERMAN KLINGAMAN, OF LOUISVILLE, OHIO

AIRCRAFT

Application filed January 26, 1931. Serial No. 511,239.

My invention relates to aircraft having a variable center of gravity, and more particularly to an airplane having a variable center of gravity and having a variable drag or resistance.

In the usual airplane, the airfoils or wings have invariable or constant aerodynamic characteristics; and in a wing having invariable or constant characteristics, the lift of the wing varies with the angle of attack or incidence, and for taking off and landing this angle of attack is greater than the angle of attack in normal flying at high speeds.

In the usual airplane, elevator control surfaces on the tail of the airplane are utilized to vary the angle of attack of the main lifting airfoils or wings. Such use of elevator control surfaces absorbs power, and also tends to throw the airplane into a tail spin.

On the other hand the landing gear of an aircraft, unless the landing gear is retractable, absorbs power, and consequently reduces speed, when the aircraft is in flight.

The objects of the present invention include the following:

First, the provision of an improved aircraft in which the angle of attack of the main lifting airfoils or wings is varied by varying the center of gravity of the airplane, instead of by operating elevator control surfaces;

Second, the provision of an aircraft including means for varying the center of gravity thereof and a retractable landing gear, the landing gear and the center of gravity varying means being operatively connected with each other preferably for automatic retraction of the landing gear and adjustment of the center of gravity to meet the varying requirements of taking off, normal flight, and landing;

Third, the provision of an aircraft, as aforesaid, and adaptable for convenient and economical manufacture.

The foregoing and other objects are attained by the aircraft, apparatus, parts, improvements, and combinations, which comprise the present invention, and which are particularly and distinctly pointed out and set forth in the appended claims forming part hereof.

Figure 4:
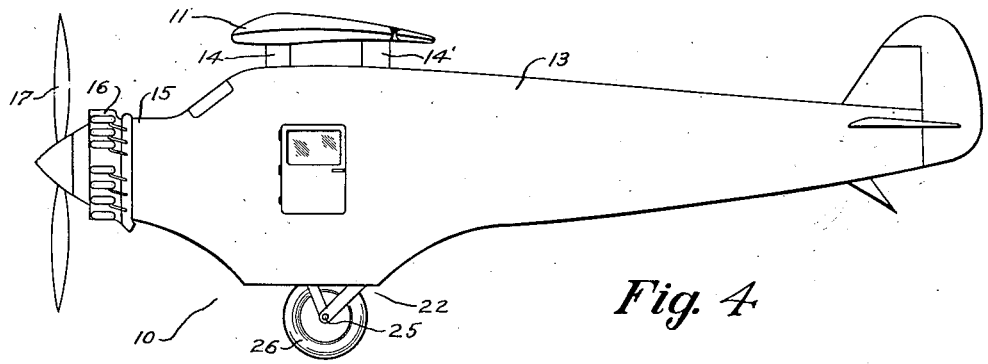
Figure 5:
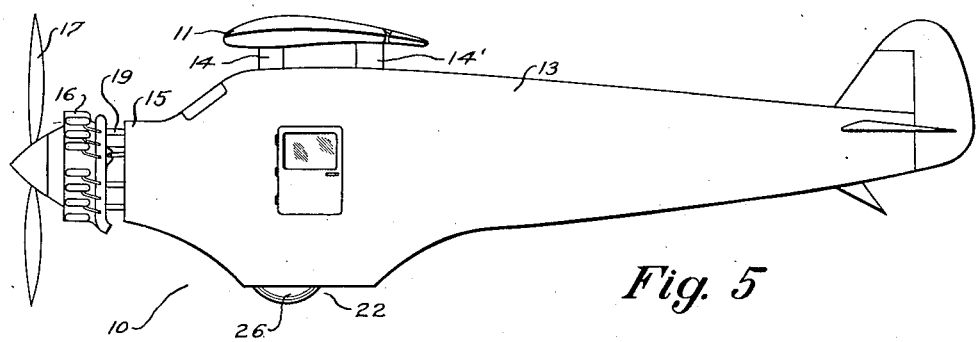

Preferred embodiments of the invention are illustrated in the accompanying drawings forming part hereof, in which Figure 1 is a fragmentary side elevation with portions in section, illustrating one embodiment of the present improvements in an airplane, the landing gear being in extended position;

Fig. 2, a fragmentary transverse sectional view thereof as on line 2—2, Fig. 1;

Fig. 3, a view similar to Fig. 1 with the landing gear in retracted position and the center of gravity of the airplane having been varied from that of the airplane when the parts thereof are in the positions illustrated in Fig. 1;

Fig. 4, a reduced elevation view similar to Fig. 1;

Fig. 5, a reduced elevation view similar to Fig. 3; and

Figure 6:
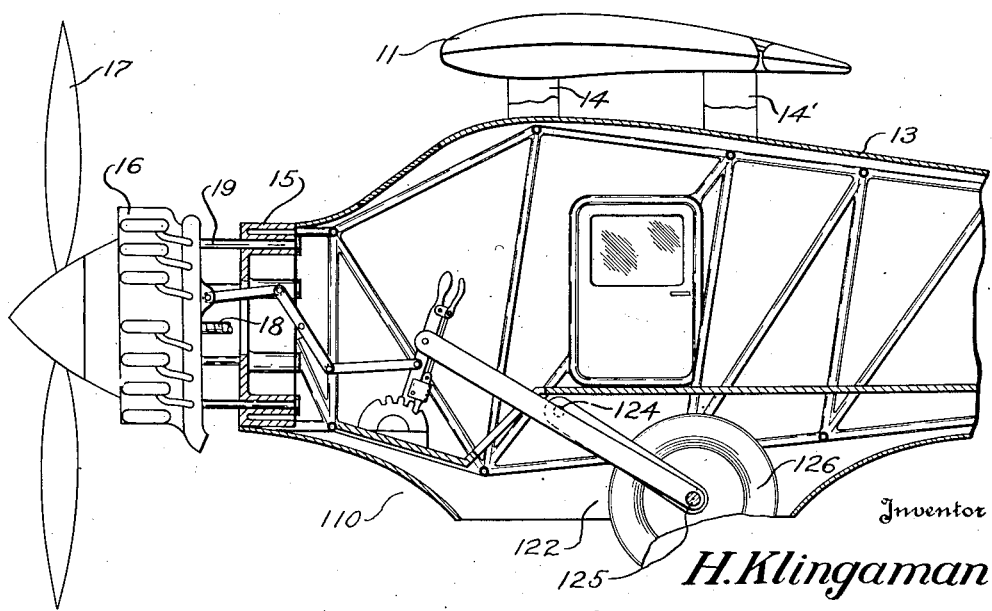

Fig. 6, a view similar to Fig. 3, illustrating another embodiment of the invention.

Similar numerals refer to similar parts throughout the several views.

One embodiment of the present improvements is indicated generally at 10 in Figs. 1 to 5 inclusive, and constitutes an airplane, which as illustrated is a monoplane, and which includes main lifting airfoils or wings 11 extending, one from each side of the longitudinal axis 12 of the airplane.

A fuselage 13 located below the wings 11 and constituting a load sustaining member, that is to say a member sustaining the cargo, passengers, and pilot, is structurally connected with the wings 11 in a usual manner, as by means of struts 14 and 14'.

At the forward end of the fuselage 13 is located another load sustaining member or engine mounting frame 15, upon which is secured the engine 16 and propeller 17, the engine and propeller being operatively associated with each other in a usual manner, and being provided preferably with flexible connections indicated by 18, whereby the engine may be connected with usual control elements, and with a fuel and oil supply, not shown, but which may be located in a usual manner within the fuselage 13, together with any usual aerodynamic control means, not shown.

The engine sustaining frame 15 is mounted for longitudinal movement with respect to the fuselage 13 in the direction of the longitudinal axis 12 of the airplane, as by means of a plurality of circumferentially spaced bearing rods 19 which extend rearwardly from the frame 15, and each of which slidably fits in a bearing block 20 located in a bearing head 21, the bearing head 21 being mounted at the forward end of the fuselage 13.

A landing gear indicated generally by 22 is pivotally mounted on the frame 23 of the fuselage 13, as on a shaft 24 located rearwardly of the axle 25 for the landing wheels 26 of the landing gear.

Link means indicated generally at 27 operatively connect the landing gear 22 with the engine mounting frame 15, whereby forward movement of the engine frame 15 and the parts mounted thereon, serve to retract the wheels 26 of the landing gear 22 from the position illustrated in Fig. 1 to the position illustrated in Fig. 3, thereby simultaneously moving the center of gravity of the airplane as a whole from its position when the parts are in the relative positions illustrated in Fig. 1, to a forward position of the center of gravity of the airplane, when the parts are in the relative positions illustrated in Fig. 3.

Accordingly the drag of the airplane as a whole is reduced by retracting the landing gear, and the angle of attack of the main lifting wings 11 is reduced by shifting the center of gravity forward.

Control means such as the sector and the latching lever indicated generally by 28 are preferably interposed in the connecting mechanism 27 between the landing gear 22 and the engine frame 15 for maintaining the fuselage 13, the landing gear 22, and the engine frame 15 at any desired positions relative to each other.

The embodiment of the invention 110 illustrated in Fig. 6 is generally similar to the embodiment 10, with the exception that the retractable landing gear 122 in the embodiment 110 pivots about a shaft 124 located forwardly of the axle 125 for the landing wheels 126 of the landing gear 122.

The operation of either embodiment of the invention is similar.

For taking off, referring to the embodiment 10, the latching lever 28' of the control means 28 is positioned as illustrated in Fig. 1 so that the landing gear 22 is in the extended position.

After flying speed has been attained, the latch 28'' of the lever 28' is released from engagement with the sector 28''', whereby the thrust of the propeller is normally sufficient to move the propeller, engine, and engine frame forward, and to retract the landing gear, after which the parts are in the relative position illustrated in Fig. 3, which, because of the forward position of the center of gravity, maintains the wings 11 at a reduced angle of attack which may be the optimum angle of attack.

For landing, the parts are returned to the positions illustrated in Fig. 1.

I claim:

1. An aircraft including fuselage members and engine supporting members movable with respect to each other, a retractable landing gear, and means operatively connecting the landing gear and the movable members for varying the relative positions of the movable members by movement of the landing gear.

2. An aircraft including engine supporting members, and cargo supporting members, the engine supporting members and cargo supporting members being movable with respect to each other, a retractable landing gear, and means operatively connecting the landing gear with the movable members for varying the relative positions of the movable members by movement of the landing gear.

3. An aircraft including engine supporting members, and wing supporting members, the engine supporting members and wing supporting members being movable with respect to each other, a retractable landing gear, and means operatively connecting the landing gear with the movable members for varying the relative positions of the movable members by movement of the landing gear.

4. An aircraft including fuselage members and engine supporting members movable with respect to each other, a landing gear pivotally connected with the fuselage members, and means operatively connecting the landing gear with the supporting members for varying the relative positions of the movable members by movement of the landing gear.

5. An aircraft including engine supporting members, and cargo supporting members, the engine supporting members and cargo supporting members being movable with respect to each other, a landing gear pivotally connected with one of the members, and means operatively connecting the landing gear with the other member for varying the relative positions of the movable members by movement of the landing gear.

6. An aircraft including engine supporting members, and wing supporting members, the engine supporting members and wing supporting members being movable with respect to each other, a landing gear pivotally connected with one of the members, and means operatively connecting the landing gear with the other member for varying the relative positions of the movable members by movement of the landing gear.

7. An aircraft including fuselage members and engine supporting members movable with respect to each other, a retractable landing gear, means operatively connecting the landing gear and the movable members for varying the relative positions of the movable members by movement of the landing gear, and means for maintaining the movable members at any desired position relative to each other.

8. An aircraft including engine supporting members, and cargo supporting members, the engine supporting members and cargo supporting members being movable with respect to each other, a retractable landing gear, means operatively connecting the landing gear with the movable members for varying the relative positions of the movable members by movement of the landing gear, and means for maintaining the movable members at any desired position relative to each other.

9. An aircraft including engine supporting members, and wing supporting members, the engine supporting members and wing supporting members being movable with respect to each other, a retractable landing gear, means operatively connecting the landing gear with the movable members for varying the relative positions of the movable members by movement of the landing gear, and means for maintaining the movable members at any desired position relative to each other.

10. An aircraft including fuselage members and engine supporting members movable with respect to each other, a landing gear pivotally connected with the fuselage members, means operatively connecting the landing gear with the supporting members for varying the relative positions of the movable members by movement of the landing gear, and means for maintaining the movable members at any desired position relative to each other.

11. An aircraft including engine supporting members, and cargo supporting members, the engine supporting members and cargo supporting members being movable with respect to each other, a landing gear pivotally connected with one of the members, means operatively connecting the landing gear with the other member for varying the relative positions of the movable members by movement of the landing gear, and means for maintaining the movable members at any desired position relative to each other.

12. An aircraft including engine supporting members, and wing supporting members, the engine supporting members and wing supporting members being movable with respect to each other, a landing gear pivotally connected with one of the members, means operatively connecting the landing gear with the other member for varying the relative positions of the movable member by movement of the landing gear, and means for maintaining the movable members at any desired position relative to each other.

In testimony that I claim the above, I have hereunto subscribed my name.

HERMAN KLINGAMAN.